(12) United States Patent
Williams

(10) Patent No.: US 6,762,239 B1
(45) Date of Patent: Jul. 13, 2004

(54) HIGHLY FUNCTIONALIZED ETHYLENE-VINYL ACETATE EMULSION COPOLYMERS

(75) Inventor: Donald R. Williams, Newtown, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 24 days.

(21) Appl. No.: 09/717,861

(22) Filed: Nov. 21, 2000

(51) Int. Cl.$^7$ ............................................. C08L 41/00
(52) U.S. Cl. ...................... 524/547; 524/459; 524/503; 524/549; 524/556; 524/558; 524/559; 524/564
(58) Field of Search ................. 524/459, 547, 524/549, 556, 558, 503, 559, 564

(56) References Cited

U.S. PATENT DOCUMENTS

| | | | | |
|---|---|---|---|---|
| 3,265,654 A | * | 8/1966 | Glabisch et al. ............ 524/767 |
| 3,692,723 A | | 9/1972 | Kasagi et al. ................ 524/155 |
| 3,741,925 A | * | 6/1973 | McDonald ................... 524/417 |
| 3,749,756 A | * | 7/1973 | Kosaka et al. ............... 525/263 |
| 3,814,623 A | * | 6/1974 | Martinez et al. ............. 428/219 |
| 3,814,712 A | * | 6/1974 | Snyder et al. ................. 524/66 |
| 3,827,996 A | * | 8/1974 | Beresniewicz .............. 524/459 |
| 4,332,850 A | | 6/1982 | Iacoviello |
| 4,446,274 A | | 5/1984 | Okazaki et al. |
| 4,449,978 A | | 5/1984 | Iacoviello |
| 4,542,182 A | * | 9/1985 | Schuppiser et al. ......... 524/377 |
| 4,698,384 A | | 10/1987 | Mao |
| 5,109,063 A | | 4/1992 | Cheng et al. |
| 5,120,785 A | | 6/1992 | Walker et al. |
| 5,143,966 A | * | 9/1992 | Lee et al. .................... 524/459 |
| 5,171,777 A | | 12/1992 | Kuphal et al. |
| 5,312,883 A | | 5/1994 | Komatsu et al. ........ 526/318.44 |
| 5,378,758 A | * | 1/1995 | Amici et al. ................. 524/115 |
| 5,473,013 A | * | 12/1995 | Zeller et al. ................. 428/503 |
| 5,591,799 A | | 1/1997 | Bott et al. |
| 5,652,293 A | * | 7/1997 | Eisenhart et al. ............ 524/459 |
| 5,747,578 A | | 5/1998 | Schmitz et al. ............. 524/502 |
| 6,087,425 A | * | 7/2000 | Eisenhart et al. ............ 524/292 |
| 6,124,397 A | * | 9/2000 | Smith .......................... 524/832 |
| 6,426,121 B1 | * | 7/2002 | Goldstein et al. ......... 427/389.8 |

FOREIGN PATENT DOCUMENTS

| | | |
|---|---|---|
| DE | 300977 | 10/1917 |
| EP | 389893 | 10/1990 |
| EP | 0 990 688 A1 | 5/2000 |
| GB | 2271717 | 4/1994 |

OTHER PUBLICATIONS

JP XP–002211761.
JP XP–002211762.

* cited by examiner

*Primary Examiner*—Judy M. Reddick
(74) *Attorney, Agent, or Firm*—Thomas F. Roland; Charles W. Almer

(57) ABSTRACT

This invention relates to aqueous emulsion copolymers comprising from about 2% to about 20% of ethylene, from about 20% to about 78% of vinyl acetate, and from about 20% to about 60% of a functionalized monomer selected from the group consisting of acid containing monomers, nitrogen containing monoolefinically unsaturated monomers, and hydroxyl containing monomers. The present invention also pertains to methods for making the ethylene vinyl acetate aqueous emulsion copolymers containing high concentrations of functionalized monomers and to ethylene vinyl acetate aqueous emulsion copolymers made by the the novel methods.

9 Claims, No Drawings

US 6,762,239 B1

HIGHLY FUNCTIONALIZED ETHYLENE-VINYL ACETATE EMULSION COPOLYMERS

FIELD OF THE INVENTION

This invention relates to aqueous emulsion copolymers comprising from about 2% to about 20% of ethylene, from about 20% to about 78% of vinyl acetate, and from about 20% to about 60% of a functionalized monomer selected from the group consisting of acid containing monomers, nitrogen containing monoolefinically unsaturated monomers, and hydroxyl containing monomers. The present invention also pertains to methods for making the ethylene vinyl acetate aqueous emulsion copolymers containing high concentrations of functionalized monomers and to ethylene vinyl acetate aqueous emulsion copolymers made by the novel methods.

BACKGROUND OF THE INVENTION

The preparation of ethylene vinyl acetate (EVA) polymers using emulsion polymerization techniques with medium pressure equipment is known. Incorporation of more than 5% (wt/wt) of a functionalized comonomer is difficult in emulsion polymerization because of many factors. First, it is important to cntrol the pH of the emulsion because functionalized monomer reactivity and emulsion stability vary with pH. Second, polymerization of functionalized monomers in the aqueous phase can lead to high viscosity emulsions and grit formation. Third, differences in monomer reactivity ratios often result in non-homogeneous copolymers. Fourth, levels of acrylic acid higher than 1.5% (wt/wt) inhibit the batch copolymerization reaction of ethylene and vinyl acetate. Fifth, incorporation of large amounts of functionalized monomer in the growing polymer creates a polar micellar environment that discourages migration of gaseous ethylene to the micelles.

Various methods have been employed to incorporate large amounts of functionalized monomers into ethylene vinyl acetate copolymers. For example, U.S. Pat. No. 5,171,777 (Kuphal et al.) describes physical blends of ethylene vinyl acetate copolymers and polymers of acrylic acid. The use of polyvinyl alcohol (PvOH) stabilization systems is described in EP 389,893 (Lenney) which claims 2–6% (wt/wt) acrylic acid incorporation although the examples only disclose 4% acrylic acid. U.S. Pat. No. 5,120,785 (Walker et al.) discloses the use of acrylic monomers to overcome the reactivity ratio problem of acrylic acid and claims up to 5% (wt/wt) acrylic acid. U.S. Pat. Nos. 5,109,063 (Cheng et al.), 4,698,384 (Mao), 4,449,978 (Iacoviello'978), and 4,332,850 (Iacoviello'850) disclose the use of N-methylol acrylamide (NMA) as a functional comonomer. The use of water-insoluble comonomers with acrylic acid and incorporation of 0.5–7% (wt/wt) acrylic acid is disclosed in U.S. Pat. No. 4,446,274 (Okazaki et al.). British patent GB 2,271,717 A1 discloses the grafting of acrylic or methacrylic acids onto ethylene vinyl acetate copolymers for medical or veterinary use. German patent DE 300,977 A7 teaches grafting of unsaturated monocarboxylic acids, such as acrylic acid, dicarboxylic acids, and anhydrides, such as maleic anhydride, using peroxide or a diazo containing initiator for use in coatings or impact modifiers. U.S. Pat. No. 5,591,799 (Bott et al.) discloses a stable aqueous emulsion containing water-insoluble, vinyl polymer particles formed by the emulsion polymerization of at least two ethylenically unsaturated monomers. The vinyl polymer comprises from 1% to 20% by weight of polymerized N-vinylformamide units and the polymerized N-vinylformamide units is hydrolyzed in a molar amount of from 8% to 30%.

None of the above disclosures describe a method for making ethylene vinyl acetate aqueous emulsion copolymers containing high concentrations of functionalized monomers. The present invention discloses methods for incorporating high levels of functionalized monomers into ethylene vinyl acetate aqueous emulsion copolymers and also discloses a novel class of self-reactive ethylene vinyl acetates having applications in the adhesive and coating formulation areas.

SUMMARY OF THE INVENTION

The present invention is directed to an aqueous emulsion copolymer comprising in percentages by weight of the total composition:
  (a) from about 2% to about 20% of ethylene;
  (b) from about 20% to about 78% of vinyl acetate; and
  (c) from about 20% to about 60% of a functionalized monomer selected from the group consisting of acid containing monomers, nitrogen containing monoolefinically unsaturated monomers, hydroxyl containing monomers, and mixtures thereof.

The present invention is also directed to a method for preparing an aqueous emulsion copolymer comprising the steps of:
  (A) providing the following monomers in percentages by weight of the total composition:
  (a) from about 2% to about 20% of ethylene;
  (b) from about 20% to about 78% of vinyl acetate; and
  (c) from about 20% to about 60% of a functionalized monomer selected from the group consisting of acid containing monomers, nitrogen containing monoolefinically unsaturated monomers, hydroxyl containing monomers, and mixtures thereof; and
  (B) emulsion polymerizing the ethylene, vinyl acetate, and functionalized monomer in water at a solids level from about 35% to about 70%.

The present invention is further directed to a method for preparing an aqueous emulsion copolymer prepared by a method comprising the steps of:
  (A) providing the following monomers in percentages by weight of the total composition:
  (a) from about 2% to about 20% of ethylene;
  (b) from about 20% to about 78% of vinyl acetate; and
  (c) from about 20% to about 60% of a functionalized monomer selected from the group consisting of acid containing monomers, nitrogen containing monoolefinically unsaturated monomers, hydroxyl containing monomers, and mixtures thereof; and
  (B) emulsion polymerizing the ethylene, vinyl acetate, and functionalized monomer in water at a solids level from about 35% to about 70%.

DETAILED DESCRIPTION OF THE INVENTION

In accord with the present invention, methods are provided for incorporating high concentrations of functionalized monomers into ethylene vinyl acetate aqueous emulsion copolymers yielding a novel class of ethylene vinyl acetate copolymers with applications in adhesive and coating formulations. The method for preparing the aqueous emulsion copolymers comprises emulsion polymerizing from about 2% to about 20% of ethylene; from about 20% to about 78% of vinyl acetate; and from about 20% to about 60% of a functionalized monomer selected from the group consisting of acid containing monomers, nitrogen containing monoolefinically unsaturated monomers, and hydroxyl containing monomers. The improved highly functionalized ethylene vinyl acetate aqueous emulsion copolymers have applications as adhesives, thickeners, alkali-soluble polymers, redispersible adhesives, graft copolymers, crosslinkable polymers, binders, hair care polymers, non-woven fabric adhesives, protective topcoats, floor polishes, temporary printing binders, adhesive binders, skin creams, sun screens, temporary decorative paints, marine coatings, repulpable paper coatings, non-woven fabric binders, glass fiber sizers, time release/erodible coatings of particles, antiperspirant films, and thermoset replacements. The ethylene vinyl acetate aqueous emulsion copolymers containing high concentrations of functionalized monomers may be crosslinked via esterification, amination, or other chemistries specific to the incorporated functional groups to formulate personal care products such as pH-sensitive thickeners, water-washable shampoos, hair sprays with stiffness, adhesives with enhanced adhesion and/or cohesion due to high levels of polar monomer incorporation. The ethylene vinyl acetate aqueous emulsion copolymers of the invention may also be blended with other polymers having reactive groups complementary (epoxies, e.g.) to those of the highly functionalized ethylene vinyl acetate copolymer leading to improved properties. Ionic salts, such as salts of potassium, lithium, sodium, chromium, magnesium, calcium, aluminum, and titanium, may also be added to the highly functionalized ethylene vinyl acetate copolymers to provide ionomers.

The methods of the present invention permit incorporation of up to 60% (wt/wt) functionalized monomers in ethylene vinyl acetate copolymers without having high viscosity, grit, or sluggish reactivity. The functionalized ethylene vinyl acetate polymers can also exhibit pH sensitivity, have good emulsion stability, are water-soluble/dispersible, cast clear and form tough films, redisperse readily in water after drying, and are post cross-linkable with suitable functional groups such as epoxides, aziridines, isocyanates, or multivalent ions. The semi-batch process for preparing the functionalized ethylene vinyl acetate polymers is (1) easy to run and control; (2) may use aqueous phase inhibitors to reduce aqueous polymerization of functionalized monomers; (3) may use a combination of anionic, nonionic, and polyvinyl alcohol stabilizers to give optimum properties; (4) is able to incorporate functionalized monomers in the initial charge without forming grit or inhibiting polymerization so that the composition is uniform and water solubility is complete; (5) is free of APE (alkyl phenol ethoxylates) nonionic surfactants allowing use in personal care products and other environmentally sensitive application areas; and (6) uses complementary reactivity of functional monomer pairs to obtain high functionality without the concomitant inhibition. Upon blending with polymers of complementary functionality or with metal salts, crosslinkable polymers formulations or ionomers, respectively, can be obtained.

The aqueous emulsion copolymers of the present invention are prepared by emulsion polymerization and are not graft polymers and are not prepared by solution polymerization. Solution polymerization methods tend to yield polymers that are low in molecular weight. Solution polymerization reactions also tend to have high viscosity, a low conversion rate at the end of the reaction with high residual monomers, and require removal of a solvent at the end of the reaction.

As set out above, aqueous emulsion copolymers are provided comprising in percentages by weight of the total composition:

(a) from about 2% to about 20% of ethylene;
(b) from about 20% to about 78% of vinyl acetate; and
(c) from about 20% to about 60% of a functionalized monomer selected from the group consisting of acid containing monomers, nitrogen containing monoolefinically unsaturated monomers, and hydroxyl containing monomers.

Preferably, the functionalized monomer in (c) is a water-soluble monomer. The functionalized monomer in (c) preferably has a water-solubility of at least 5%, more preferably at least 7%, and most preferably at least 10% (g monomer/g water).

The functionalized monomer in (c) may be an acid selected from the group consisting of monomers containing a carboxylic acid group, monomers containing a sulfonic acid group, and monomers containing a phosphoric acid group.

In one embodiment, the functionalized monomer in (c) may be a carboxylic acid containing monomer selected from the group consisting of $C_3$–$C_{10}$ alkenoic acids, α, β-unsaturated $C_4$–$C_{10}$ alkenedioic acids, and monoesters of α, β-unsaturated $C_4$–$C_{10}$ alkenedioic acids with $C_1$–$C_{18}$ alkanois. Preferably, the carboxylic acid containing monomer is a $C_3$–$C_{10}$ alkenoic acid selected from the group consisting of acrylic acid, methacrylic acid, crotonic acid, and isocrotonic acid, more preferably, the $C_3$–$C_{10}$ alkenoic acid is acrylic acid.

The carboxylic acid containing monomer may also be an α, β-unsaturated $C_4$–$C_{10}$ alkenedioic acid selected from the group consisting of maleic acid, maleic anhydride, acrylic acid dimer (β-carboxyethyl acrylate), fumaric acid, and itaconic acid. The carboxylic acid containing monomer may further be a monoester of an α, β-unsaturated $C_4$–$C_{10}$ alkenedioic acid with a $C_1$–$C_{18}$ alkanol selected from the group consisting of maleic acid, fumaric acid, and itaconic acid.

In another embodiment, the functionalized monomer in (c) may be a sulfonic acid containing monomer selected from the group consisting of styrene sulfonic acid, 2-acrylamido-2-methylpropane sulfonic acid, and sodium vinyl sulfonate. Preferably, the monomer containing a sulfonic acid group is styrene sulfonic acid or 2-acrylamido-2-methylpropane sulfonic acid.

In another embodiment, the functionalized monomer in (c) may be a phosphoric acid containing monomer selected from the group consisting of styrene phosphoric acid, sodium vinyl phosphonate, and $CH_2=C(CH_3)COO(CH_2)_n OPO_3H$, wherein n is from 2 to 4. Preferably, the monomer containing a phosphoric acid group is $CH_2=C(CH_3)COO(CH_2)_nOPO_3H$, wherein n is from 2 to 4.

The functionalized monomer in (c) may also be a nitrogen containing monoolefinically unsaturated monomer selected from the group consisting of nitriles, amides, N-methylol amides, $C_1$–$C_4$ alcoholic ethers of N-methylol amides, allylcarbamates, and lower alkyl ethers or lower alkanoic acid esters of N-methylol acrylamide. Preferably, the acid containing monomer is a nitrogen containing monoolefinically unsaturated monomer selected from the group consisting of acrylonitrile, acrylamide, methacrylamide, N-methylol acrylamide, N-methylol methacrylamide, N-methylol allylcarbamate, N-methylol methacrylamide, N-methylol allylcarbamate, N-vinyl formamide, N-vinyl pyrrolidone, and N-vinyl acetamide.

The functionalized monomer in (c) may also be a hydroxyl containing monomer selected from the group consisting of hydroxyethyl acrylate, hydroxyethyl methacrylate, hydroxypropyl acrylate, hydroxypropyl methacrylate, hydroxybutyl acrylate, and hydroxybutyl methacrylate. Preferably, the hydroxyl containing monomer is hydroxyethyl acrylate.

The amount of ethylene employed in the ethylene vinyl acetate aqueous emulsion copolymer containing high concentrations of functionalized monomers is an effective amount for the particular application of the polymer. The exact amount of ethylene used may vary depending upon the specific functionalized monomer employed in the aqueous emulsion copolymer as well as the end use of the aqueous emulsion copolymer. In a preferred embodiment, ethylene is present in the aqueous emulsion copolymer in an amount from about 2% to about 20%, preferably from about 7% to about 20%, more preferably from about 9% to about 20%, and most preferably from about 10% to about 20%, by weight.

The amount of vinyl acetate employed in the ethylene vinyl acetate aqueous emulsion copolymer containing high concentrations of functionalized monomers is an effective amount for the particular application of the polymer. The exact amount of vinyl acetate used may vary depending upon the specific functionalized monomer employed in the aqueous emulsion copolymer as well as the end use of the aqueous emulsion copolymer. In a preferred embodiment, vinyl acetate is present in the aqueous emulsion copolymer in an amount from about 20% to about 78%, preferably from about 20% to about 60%, more preferably from about 20% to about 50%, and most preferably from about 20% to about 40%, by weight.

The amount of functionalized monomer employed in the ethylene vinyl acetate aqueous emulsion copolymer containing high concentrations of functionalized monomers is an effective amount for the particular application of the polymer. The exact amount of functionalized monomer used may vary depending upon the specific functionalized monomer employed in the aqueous emulsion copolymer as well as the end use of the aqueous emulsion copolymer. In a preferred embodiment, the functionalized monomer is present in the aqueous emulsion copolymer in an amount from about 20% to about 60%, preferably from about 25% to about 60%, more preferably from about 30% to about 60%, and most preferably from about 35% to about 60%, by weight. In a very preferred embodiment, the functionalized monomer is present in the aqueous emulsion copolymer in an amount from about 40% to about 60%, by weight.

The present invention also provides a method for preparing an aqueous emulsion copolymer. The method comprises the steps of:

(A) providing the following monomers in percentages by weight of the total composition:

(a) from about 2% to about 20% of ethylene;

(b) from about 20% to about 78% of vinyl acetate; and (c) from about 20% to about 60% of a functionalized monomer selected from the group consisting of acid containing monomers, nitrogen containing monoolefinically unsaturated monomers, and hydroxyl containing monomers; and (B) emulsion polymerizing the ethylene, vinyl acetate, and functionalized monomer in water at a solids level from about 35% to about 70%.

The functionalized monomer in (c) is as described above. The method for preparing the aqueous emulsion copolymers is an important part of the present invention so that polymers with sufficient functionality to be useful as an adhesive, personal care product, thickener, cross-linkable polymer, or ionomer without grit, high viscosity, or polymerization inhibition may be obtained. In preferred embodiments, the vinyl acetate and the functionalized monomer are pre-emulsified prior to the emulsion polymerizing in (B); the emulsion polymerizing in (B) is carried out in the presence of an aqueous phase inhibitor present in an amount from about 1 ppm to about 500 ppm, and the aqueous phase inhibitor is a para-nitrosophenol derivative; the emulsion polymerizing in (B) is carried out in the presence of a buffering agent to maintain the pH of the emulsion in the range from about 2 to about 6; the emulsion polymerizing in (B) is carried out by initially reacting from about 5% to about 60% of the ethylene and the vinyl acetate and from about 0% to about 10% of the functionalized monomer and thereafter adding the remaining amounts of ethylene, vinyl acetate, and functionalized monomer at a rate so as to maintain an exothermic reaction.

Described below are process conditions which have been found to be effective in producing an aqueous ethylene-vinyl acetate emulsion polymer having high amounts of functional comonomer. In a typical reaction condition, a reaction vessel is charged initially with 5–60% (preferably 20–50%) of the initial monomers including 0–10% (preferably 2–8%) of the functional comonomer(s) and the remaining monomers are slow added so as to maintain an exothermic reaction and uptake of ethylene. The addition time can be as long as 10 hours but shorter times are preferable to maximize throughput during production and to improve product performance. The amount of ethylene incorporated into the polymer depends on unreacted vinyl acetate, pressure, viscosity of the polymerization medium and agitation as well as upon the amount of surfactant and the amount of functional comonomer in the initial charge. Thus, to increase the ethylene content of the copolymer, high pressure, high agitation, low viscosity, and low surfactant and functional comonomer in the initial charge should be utilized. Ethylene pressures range from about 250 to about 1400 psig (17–95 atm), preferably from about 400 to about 1000 psig (27–68 atm).

Polymerization may be initiated by either thermal or redox initiation systems. Thermal initiators are typically employed at temperatures above 70° C. and redox systems are preferable below 70° C. The amount of thermal initiator used in the process is from about 0.1 to about 5 wt %, preferably more than 1 wt %, based on total monomers. Examples of thermal initiators well known to those skilled in the emulsion polymerization art are ammonium persulfate, sodium persulfate, and the like. The amount of oxidizing and reducing agent in the redox system is from about 0.1 to about 5 wt %. Many redox systems may be employed; for example, the reducing agent can be a bisulfite, a sulfoxylate, ascorbic acid, erythrobic acid, and the like. The oxidizing agent can include hydrogen peroxide, hydroperoxides, persulfates, and the like. Other polymerization initiators include ammonium persulfate, sodium persulfate, hydrogen peroxide, t-butyl hydroperoxide, dialkyl peroxides, peroxyesters, 2,2'-azobisisobutyronitrile, 2,2'-azobis(2-methylbutyronitrile), 2,2'-azobis(2,4-dimethylvaleronitrile), 2,2'-azobis(2-amidinopropane) dihydrochloride, and 2,2'-azobis(N,N-dimethyleneisobutylamidine). Reducing agents include ascorbic acid, sodium formaldehyde sulfoxylate, sodium meta-bisulfite, and 2-hydroxy-2-sulfinicacetic acid. Preferably, the emulsion polymerizing is initiated by a redox initiation system.

Chain transfer agents may optionally be used. Typical examples of those chain transfer agents used in the emulsion polymerization art are dodecyl mercaptan, mercaptocarboxylic acids and esters of mercaptocarboxylic acids. Typical levels of chain transfer agent are 0.02% to 2 wt %, preferably 0.1% to 1 wt %, based on monomer weight.

The reaction temperature should be well controlled. Typically, effective temperatures are from about 50° C. to about 90° C., preferably from about 60° C. to about 80° C.

Stabilizers are important for obtaining particle size, monomer emulsion stabilization, polymer emulsion stabilization, ethylene incorporation, and properties. A mixture of poly(vinyl alcohol), non-APE nonionic surfactant, and anionic surfactants have been found to be optimal. Typical stabilization packages consist of from about 2% to about 10 wt % poly(vinyl alcohol), from about 2% to about 10 wt % non-APE nonionic surfactant, and from about 0.5% to about 2 wt % anionic surfactant. All weights are solids%/solids%, based on total monomer.

The poly(vinyl alcohol) that is used in these systems can be from about 75 to about 99+ mole % hydrolyzed, preferably from about 85 to about 90, and has a degree of polymerization ranging from about 50 to about 3000, preferably from about 100 to about 1500. Both the degree of polymerization and the degree of hydrolysis affect the emulsion viscosity which should be kept low for ease of handling.

Nonionic surfactants without alkyl phenol ethoxylate groups ("non-APE") are preferred since use in personal care products is indicated. Among the nonionic surfactants that provide good results are the Tergitol series, supplied by Union Carbide, and the Disponil series, manufactured by Henkel. These surfactants are members of a series of ethoxylated alcohols. Other nonionic surfactants with phenoxy groups can also be used. Among the preferred examples are the Igepals by. Rhone Poulenc. A smaller amount of anionic surfactant has been found effective for controlling particle size and emulsion monomer and polymer stability. Typical among the surfactants used are the Aerosol series of sulfosuccinic acid derivative salts provided by Cytec. Alkyl phenol ethoxylate group containing surfactants may also be used when so desired.

Maroxols are aqueous phase inhibitors that have found use in these systems to control aqueous polymerization of water-soluble monomers and control viscosity. Maroxols are para-nitrosophenol derivatives that are incorporated in an amount from about 50 to about 500 ppm based on monomer, preferably from about 100 to about 250 ppm. Iron and ethylenediamine tetraacetic acid salts ensure rapid, consistent initiation of the polymerization and are used from about 0.1% to about 0.75 wt, % based on monomer, preferably from about 0.25% to about 0.55 wt %. Sodium acetate is added in an amount from about 0.1% to about 1 wt %, preferably from about 0.4 to about 0.8 wt %, to buffer the reaction during polymerization.

The highly functionalized ethylene-vinyl acetate aqueous emulsion copolymers of the present invention have been difficult to prepare for a variety of reasons. The functionalized monomers are generally quite water-soluble and tend to polymerize in the aqueous phase, leading to highly viscous and/or unstable emulsions. Polymerization rates can be highly dependent on pH. For example, the sodium salt of acrylic acid does not undergo polymerization at a reasonable rate. Therefore, pH must be controlled throughout the course of the reaction using a buffer system. Reactivity of functionalized monomers with ethylene and vinyl acetate is not favored. Consequently, these polymerizations often lead to non-homogeneous polymer. Small amounts of acrylic acid (>1.5%) inhibit the batch polymerization of ethylene and vinyl acetate. The presence of polar monomers in the growing polymeric particle creates a polar environment that discourages migration of gaseous ethylene to the micelles.

Although one cannot change the water solubility of these monomers, two important adjustments can be made to standard procedures to ensure that polymerization takes place in the growing polymer particles. Use of a water-phase inhibitor such as Maroxol 20 can reduce aqueous polymerization substantially. Moreover, if the monomer mix is pre-emulsified, it is somewhat more protected from polymerizing in the water phase and is much more likely to be delivered intact to the growing particle polymerization locus. The low viscosity of these polymers indicates that aqueous polymerization has been largely suppressed and that acrylic acid has been incorporated for the most part into the polymer backbone.

Buffer is generally used in the initial charge in the monomer emulsion. Continuous addition of buffer optimizes pH control necessary for vigorous polymerization.

There is generally a limit to how much acrylic acid can be incorporated into these systems. This limit can be greatly extended by use of hydroxyethyl acrylate as an additional comonomer. It was found that using a 1:1 ratio of acrylic acid and hydroxyethyl acrylate, one could obtain up to about 20% acrylic acid in the polymer. Previous work lead to a maximum of 12% acrylic acid incorporation into very high viscosity polymer. Small amounts of hydroxyethyl acrylate with acrylic acid were needed to effect polymerization at a reasonable rate. Accordingly, the amount of acrylic acid could be raised to 40% and above. Apparently, the hydroxyethyl acrylate and acrylic acid pair and the ethylene and vinyl acetate pair react very well together, independent of the other pair's reactivity. Only small amounts, several percent, of the hydroxyethyl acrylate are needed to obtain the substantial increases observed in acrylic acid incorporation.

Use of a rather large initial charge containing smaller amounts of acrylic acid and hydroxyethyl acrylate, rather than in the slow add, allows the reaction to reach faster conversion rates before being flooded with the higher amounts of acrylic acid present in the slow add. The reaction can therefore continue at a reasonable rate throughout the course of the slow add and the inhibitory effect of the acrylic acid is largely overcome.

Minimizing the amount of acrylic acid and of hydroxyethyl acrylate in the initial charge allows a substantial uptake of ethylene during the batch polymerization of the initial charge which then carries over into the slow add portion of the reaction. The amount of ethylene taken up during the slow add is controlled by the faster conversion rates built up by polymerization of the initial charge, by the rate of oxidizer/reducer addition during the slow add, by the rate of emulsified monomer addition and by the amount of buffer in the monomer emulsion.

The precise formulation of the ethylene vinyl acetate aqueous emulsion copolymers containing high concentrations of functionalized monomers of the present invention will vary depending upon the specific end use. Other ingredients may also be incorporated into the aqueous emulsion copolymers as dictated by the nature of the desired composition as well known by those having ordinary skill in the art. Examples of additives traditionally used include plasticizers, tackifiers, thickeners, fillers, humectants, surfactants, defoamers, and wetting agents which may be employed in conventional amounts.

Illustrative examples of plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. When present, plasticizers are generally used in amounts of 2 to 20 parts by weight, preferably 3 to 15 parts.

Illustrative examples of tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamide-formaldehyde resin, and wood rosin. When present, tackifiers are generally used in dispersion form at 40% to 65% solids in amounts up to about 50 parts by weight, preferably 2 to 20 parts.

Illustrative examples of thickeners include associative thickeners such as hydrophobically modified ethoxylated polyurethanes and hydrophobically modified alkali soluble emulsions, as well as alkali soluble emulsions. Other thickeners include aliginates, bentonite, casein, fumed silica, guar gum, gum tragacanth, hydroxyethylcellulose, locust bean gum, methylcellulose, polyacrylic acid salts (ammonium, potassium, sodium), polyvinyl alcohol, sodium carboxymethyl cellulose, and starches. When present, thickeners will be used in amounts up to about 25 parts by weight.

Illustrative examples of fillers include bentonites, calcium carbonate, calcium silicate, clay, mica, nut shell flours, silica, talc, uncooked starches, and wood flour. When present, fillers will be used in amounts up to about 20 parts by weight.

Illustrative examples of humectants include calcium chloride, diethylene glycol, glycerine, hexylene glycol, propylene glycol, magnesium chloride, sodium nitrate, sorbitol, sucrose, and urea. When present, humectants will be used in amounts up to about 20 parts by weight.

Surfactants are often employed in adhesive compositions to increase the penetrating effects of the adhesive. The surfactants may be one or more of anionic, cationic, amphoteric or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quatemary ammonium salts, and alkyl quaternary phosphonium salts. One type of suitable non-ionic emulsifier is the addition product of 5 to 50 moles of ethylene oxide adducted to straight-chain and branched-chain alkanols with 6 to 22 carbon atoms, or to alkylphenols. higher fatty acids, higher fatty acid amines, or primary and secondary higher alkyl amines. Other suitable non-ionic emulsifiers are one or more block copolymers of propylene oxide with ethylene oxide. Other surfactants include fluorinated alkyl amphoterics or sodium dioctylsulfosuccinate. When present, the surfactant will be used in amounts of about 0.05 to 5.0 parts by weight.

A polymerization initiator may be employed in the emulsion polymerization. Examples of the polymerization initiators include ammonium persulfate, sodium persulfate, hydrogen peroxide, t-butyl hydroperoxide, dialkyl peroxides, peroxyesters, 2,2'-azobisisobutyronitrile, 2,2'-azobis(2-methylbutyronitrile), 2,2'-azobis(2,4-dimethylvaleronitrile), 2,2'-azobis(2-amidinopropane) dihydrochloride, and 2,2'-azobis(N,N-dimethyleneisobutylamidine). Reducing agents include ascorbic acid, sodium formaldehyde sulfoxylate, sodium meta-bisulfite, and 2-hydroxy-2-sulfinicacetic acid. The amount of the polymerization initiator ranges from about 0.01% to about 5% by weight based on the monomers. The polymerization temperature which varies depending on the selection of monomers ranges from about 30° C. to about 90° C. and the polymerization time ranges from about 1 to about 7 hours.

The aqueous emulsion copolymers of the present invention are useful in personal care products and pharmacological products which are available in a variety of types and forms. A classification according to personal product type would consist of hair care products, bath products, cleansing products, skin care products, shaving products, deodorant/antiperspirant products and oral hygiene products.

Examples of hair care products include, but are not limited to, rinses, conditioners, shampoos, conditioning shampoos, antidandruff shampoos, antilice shampoos, coloring shampoos, curl maintenance shampoos, baby shampoos, herbal shampoos, hair loss prevention shampoos, hair growth/promoting/stimulating shampoos, hairwave neutralizing shampoos, hair setting products, hair sprays, hair styling products, permanent wave products, hair straightening/relaxing products, mousses, hair lotions, hair tonics, hair promade products, brilliantines and the like.

Examples of bath products include, but are not limited to, bath oils, foam or bubble baths, therapeutic baths, after bath products, after bath splash products and the like.

Examples of cleansing products include, but are not limited to, shower cleansers, shower gels, body shampoos, hand/body/facial cleansers, abrasive scrub cleansing products, astringent cleansers, makeup cleansers, liquid soaps, toilet soap bars, syndet bars and the like.

Examples of skin care products include, but are not limited to, hard/body/facial moisturizers, hand/body/facial creams, massage creams, hand/body/facial lotions, sunscreen products, tanning products, selftanning products, aftersun products, masking products, lipsticks, lip gloss products, rejuvenating products, antiaging products, antiwrinkle products, anticellulite products, antiacne products and the like.

Examples of shaving products include, but are not limited to, shaving creams, aftershave products, preshave products and the like.

Examples of deodorant/antiperspirant products include, but are not limited to, deodorant products, antiperspirant products and the like.

Examples of oral hygiene products include, but are not limited to mouthwashes, prebrushing dental rinses, postbrushing rinses, dental sprays, dental creams, toothpastes, toothpaste gels, toothpowders, dental cleansers, dental flosses, chewing gums, lozenges and the like.

A classification according to personal product and detergent form would consist of aerosols, liquids, gels, creams, lotions, sprays, pastes, roll-on, stick, tablet, powdered, granular and bar form.

Throughout this application, various publications have been referenced. The disclosures in these publications are incorporated herein by refererice in order to more fully describe the state of the art.

Throughout this disdosure, applicant will suggest various theories or mechanisms by which applicant believes the components in the adhesive compositions function together in an unexpected manner to provide unique waterborne adhesives. While applicant may offer various mechanisms to explain the present invention, applicant does not wish to be bound by theory. These theories are suggested to better understand the present invention but are not intended to limit the effective scope of the claims.

The present invention is further illustrated by the following examples which are presented for purposes of demonstrating, but not limiting, the preparation of the compounds and compositions of this invention.

EXAMPLES

The ethylene vinyl acetate aqueous emulsion copolymers containing high concentrations of functionalized monomers of the present invention were prepared in a 10 liter stainless steel medium pressure reactor. The reactor was equipped with a jacket for heating and cooling, a two-blade 45 degree pitched blade turbine, and metering pumps for addition of various reaction components. Deionized water was used.

Example 1

The reactor was charged with 2,213 g water, 71.3 g Tergitol 15S5, 59.6 g Polystep B-5 (30% solution), 272.6 g Airvol 205 (25% solution), 11.1 g iron sulfate hexahydrate (1% solution), 11.1 g Versene, 0.6 g ascorbic acid, 12 g sodium acetate, 0.3 g Maroxol 20 and 478.2 g vinyl acetate. The reactor was then purged with nitrogen and with ethylene and heated with agitation to 50° C., then pressurized to 600 psi ethylene. Addition of a t-butyl hydroperoxide solution (351.6 g water and 86 g t-butyl hydroperoxide) and a buffered ascorbic acid solution (269.6 g water, 57.4 g ascorbic acid, 3 g sodium acetate and 107.6 g Polystep B-5) was commenced at a 2 hour addition rate. When temperature rise indicated initiation, the jacket temperature was increased to 80° C. When the reactor temperature reached 73° C., a slow addition of an emulsified monomer mix consisting of 1,493.3 g water, 106.7 g Tergitol 15S5, 480.1 g Airvol 205 (25% solution), 12 g sodium acetate, 448.3 g acrylic acid and 1,554 g vinyl acetate was begun at a 3 hour rate. Fifteen minutes into the slow addition, the t-butyl hydroperoxide and ascorbic acid solution rates were decreased by half. During the course of the reaction, the ethylene pressure was allowed to decrease. The t-butyl hydroperoxide and ascorbic acid solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g sodium formaldehyde sulfoxylate in 17 g water.

The physical properties of the latex were:

| % Solids | 38.3% |
| --- | --- |
| Viscosity | 30 cps |
| pH | 4.3 |
| Tg | 13.4° C. |
| Particle Size | 509 nm |

Example 2

The reactor was charged with 2,660 g water, 106.9 g Tergitol 15S5, 89.4 g Aerosol A102 (31% solution), 411.6 g Airvol 205 (25% solution), 11.1 g iron sulfate hexahydrate (1% solution), 11.1 g Versene, 0.6 g ascorbic acid, 6 g sodium acetate, 0.3 g Maroxol 20, 866.7 g vinyl acetate and 89.7 g hydroxyethyl acrylate. The pH is adjusted to 4 with phosphoric acid. The reactor was then purged with nitrogen and with ethylene and heated with agitation to 50° C., then pressurized to 600 psi ethylene. Addition of a 30% hydrogen peroxide solution (351.6 g water and 172.2 g 30% hydrogen peroxide) and a buffered ascorbic acid solution (405.8 g water, 114.8 g ascorbic acid and 3 g sodium acetate) was commenced at a 3.5 hour addition rate. When temperature rise indicated initiation, the jacket temperature was increased to 80° C. When the reactor temperature reached 60° C., a slow addition of an emulsified monomer mix consisting of 866.7 g water, 106.7 g Tergitol 15S5, 480.1 g Airvol 205 (25% solution), 12 g sodium acetate, 358.6 g hydroxyethyl acrylate and 1,165.5 g vinyl acetate was begun at a 3.5 hour rate and the hydrogen peroxide and ascorbic acid solution rates were reduced by half. Temperature is controlled at 75° C. by reducing the jacket temperature to 70° C. and varying the hydrogen peroxide solution addition rate. During the course of the reaction, the ethylene pressure was allowed to decrease. The hydrogen peroxide and ascorbic acid solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g sodium formaldehyde sulfoxylate in 17 g water.

The physical properties of the latex were:

| % Solids | 37.8% |
| --- | --- |
| Viscosity | 60 cps |
| pH | 2.8 |
| Particle Size | 439 nm |

Example 3

The reactor was charged with 2,660 g water, 94.1 g Tergitol 15S5, 89.4 g Aerosol A102 (31% solution), 351.8 g Airvol 205 (25% solution), 11.1 g iron sulfate hexahydrate (1% solution), 11.1 g Versene, 0.6 g ascorbic acid, 12 g sodium acetate, 0.3 g Maroxol 20, 179.3 g acrylic acid, 179.3 g hydroxyethyl acrylate and 597.7 g vinyl acetate. The reactor was then purged with nitrogen and with ethylene and heated with agitation to 50° C., then pressurized to 600 psi ethylene. Addition of a t-butyl hydroperoxide solution (351.6 g water and 172.2 g t-butyl hydroperoxide) and a buffered ethylene vinyl acetate aqueous emulsion copolymers containing high concentrations of functionalized monomers Bruggolite FF 6 FF 6® (2-hydroxy-2-sulfinicacetic acid) solution (405.8 g water, 114.8 g Bruggolite FF 6® and 3 g sodium acetate) was commenced at a 2 hour addition rate. When temperature rise indicated initiation, the jacket temperature was increased to 80° C. When the reactor temperature reached 60° C., a slow addition of an emulsified monomer mix consisting of 866.7 g water, 119.5 g Tergitol 15S5, 540 g Airvol 205 (25% solution), 12 g sodium acetate, 269 g acrylic acid, 269 g hydroxyethyl acrylate and 986.2 g vinyl acetate was begun at a 2.5 hour rate and the t-butyl hydroperoxide and Bruggolite FF 6® solution rates were reduced by half. Temperature was controlled at 75° C. by reducing the jacket temperature to 70° C. and varying the t-butyl hydroperoxide solution addition rate. During the course of the reaction, the ethylene pressure was allowed to decrease. The t-butyl hydroperoxide and Bruggolite FF 6® solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g Bruggolite FF 6® in 17 g water.

The physical properties of the latex were:

| % Solids | 39.2% |
|---|---|
| Viscosity | 800 cps |
| pH | 4.2 |
| Particle Size | 352 nm |

Example 4

The reactor was charged with 2,660 g water, 64.3 g Tergitol 15S5, 89.4 g Aerosol A102 (31% solution), 292 g Airvol 205 (25% solution), 11.1 g iron sulfate hexahydrate (1% solution), 11.1 g Versene, 0.6 g ascorbic acid, 6 g sodium acetate, 0.3 g Maroxol 20, 179.3 9 acrylic acid, 179.3 g hydroxyethyl acrylate and 597.7 g vinyl acetate. The reactor was then purged with nitrogen and with ethylene and heated with agitation to 50° C., then pressurized to 600 psi ethylene. Addition of a t-butyl hydroperoxide solution (197.8 g water and 64 g t-butyl hydroperoxide) and a buffered Bruggolite FF 6® solution (202.9 g water, 57.4 g Bruggolite FF 6® and 1.5 g sodium acetate) was commenced at a 2 hour addition rate. When temperature rise indicated initiation, the jacket temperature was increased to 80° C. When the reactor temperature reached 60° C., a slow addition of an emulsified monomer mix consisting of 866.7 g water, 149.4 g Tergitol 15S5, 599.8 g Airvol 205 (25% solution), 12 g sodium acetate, 448.3 g acrylic acid, 448.3 g hydroxyethyl acrylate and 627.6 g vinyl acetate was begun at a 1.75 hour rate and the t-butyl hydroperoxide and Bruggolite FF 6® solution rates were reduced by half. Temperature was controlled at 75° C. by reducing the jacket temperature to 70° C. and varying the t-butyl hydroperoxide solution addition rate. During the course of the reaction, the ethylene pressure was allowed to decrease. The t-butyl hydroperoxide and Bruggolite FF 6® solutions were fed for an additional 30 minutes after the end of the monomer slow addition.

The contents were then cooled to 55° C. and transferred to a 20 liter vessel to remove any unreacted ethylene. The following solutions were added. to reduce the amount of unreacted monomer: 4.2 g t-butyl hydroperoxide in 17 g water and 4.2 g Bruggolite FF 6® in 17 g water.

The physical properties of the latex were:

| % Solids | 39.1% |
|---|---|
| Viscosity | 1,225 cps |
| pH | 4.0 |
| Particle Size | 480 nm |

Example 5

The reactor was charged with 2,660 g water, 64.3 g Tergitol 15S5, 89.4 g Aerosol A102 (31% solution), 292 g Airvol 205 (25% solution), 11.1 g iron sulfate hexahydrate (1% solution), 11.1 g Versene, 0.6 g ascorbic acid, 6 g sodium acetate, 0.3 g Maroxol 20, 179.3 g acrylic acid, 179.3 g hydroxyethyl acrylate and 597.7 g vinyl acetate. The reactor was then purged with nitrogen and with ethylene and heated with agitation to 50° C., then pressurized to 600 psi ethylene. Addition of a t-butyl hydroperoxide solution (197.8 g water and 64 g t-butyl hydroperoxide) and a buffered Bruggolite FF 6® solution (202.9 g water, 57.4 g Bruggolite FF 6® and 1.5 g sodium acetate) was commenced at a 2 hour addition rate. When temperature rise indicated initiation, the jacket temperature was increased to 80° C. When the reactor temperature reached 60° C., a slow addition of an emulsified monomer mix consisting of 866.7 g water, 149.4 g Tergitol 15S5, 599.8 g Airvol 205 (25% solution), 12 9 sodium acetate, 567.8 g acrylic acid, 448.3 g hydroxyethyl acrylate and 508.1 g vinyl acetate) was begun at a 1.75 hour rate and the t-butyl hydroperoxide and Bruggolite FF 6® solution rates were reduced by half. Temperature was controlled at 75° C. by reducing the jacket temperature to 70° C. and varying the t-butyl hydroperoxide solution addition rate. During the course of the reaction, the ethylene pressure was allowed to decrease. The t-butyl hydroperoxide and Bruggolite FF 6® solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g Bruggolite FF 6® in 17 g water.

The physical properties of the latex were:

| % Solids | 39.6% |
|---|---|
| Viscosity | 1,850 cps |
| pH | 3.9 |
| Particle Size | 630 nm |

Example 6

The reactor was charged with 2,660 g water, 64.3 g Tergitol 15S5, 89.4 g Aerosol A102 (31% solution), 292 g Airvol 205 (25% solution), 11.1 g iron sulfate hexahydrate (1% solution), 11. 1 g Versene, 0.6 g ascorbic acid, 6 g sodium acetate, 0.3 g Maroxol 20, 179.3 g acrylic acid, 179.3 g hydroxyethyl acrylate and 597.7 g vinyl acetate. The reactor was then purged with nitrogen and with ethylene and heated with agitation to 50° C., then pressurized to 600 psi ethylene. Addition of a t-butyl hydroperoxide solution (197.8 g water and 64 g t-butyl hydroperoxide) and a buffered Bruggolite FF 6® solution (202.9 g water, 57.4 g Bruggolite FF 6® and 1.5 g sodium acetate) was commenced at a 2 hour addition rate. When temperature rise indicated initiation, the jacket temperature was increased to 80° C. When the reactor temperature reached 60° C., a slow addition of an emulsified monomer mix consisting of 866.7 g water, 149.4 g Tergitol 15S5, 599.8 g Airvol 205 (25% solution), 12 g sodium acetate, 717.2 g acrylic acid, 298.9 g hydroxyethyl acrylate and 508.1 g vinyl acetate was begun at a 1.75 hour rate and the t-butyl hydroperoxide and Bruggolite FF 6® solution rates were reduced by half. Temperature was controlled at 75° C. by reducing the jacket temperature to 70° C. and varying the t-butyl hydroperoxide solution addition rate. During the course of the reaction, the ethylene pressure was allowed to decrease. The t-butyl hydroperoxide and Bruggolite FF 6® solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g Bruggolite FF 6® in 17 g water.

The physical properties of the latex were:

| % Solids | 37.5% |
|---|---|
| Viscosity | 460 cps |
| pH | 3.8 |
| Particle Size | 568 nm |

Example 7

The reactor was charged with 2,486 g water, 49.3 g Tergitol 15S5, 89.4 g Aerosol A102 (31% solution), 231.9 g Airvol 205 (25% solution), 11.1 g iron sulfate hexahydrate (1% solution), 11.1 g Versene, 0.6 g ascorbic acid, 6 g sodium acetate, 0.3 g Maroxol 20, 179.3 g acrylic acid, 149.4 g hydroxyethyl acrylate and 627.6 g vinyl acetate. The reactor was then purged with nitrogen and with ethylene and heated with agitation to 50° C., then pressurized to 600 psi ethylene. Addition of a t-butyl hydroperoxide solution (197.8 g water and 64 g t-butyl hydroperoxide) and a buffered Bruggolite FF 6® solution (202.9 g water, 57.4 g Bruggolite FF 6® and 1.5 g sodium acetate) was commenced at a 2 hour addition rate. When temperature rise indicated initiation, the jacket temperature was increased to 80° C. When the reactor temperature reached 60° C., a slow addition of an emulsified monomer mix consisting of 1,040 g water, 164.4 g Tergitol 15S5, 659.9 g Airvol 205 (25% solution), 12 g sodium acetate, 1,016.1 g acrylic acid, 89.7g hydroxyethyl acrylate and 418.4 g vinyl acetate was begun at a 1.75 hour rate and the t-butyl hydroperoxide and Bruggolite FF 6® solution rates were reduced by half. Temperature was controlled at 75° C. by reducing the jacket temperature to 70° C. and varying the t-butyl hydroperoxide solution addition rate. During the course of the reaction, the ethylene pressure was allowed to decrease. The t-butyl hydroperoxide and Bruggolite FF 6® solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g Bruggolite FF 6® in 17 g water.

The physical properties of the latex were:

| % Solids | 38.4% |
|---|---|
| Viscosity | 1,875 cps |
| pH | 3.7 |
| Particle Size | 620 nm |

Example 8

The reactor was charged with 2,486 g water, 49.3 g Tergitol 15S5, 89.4 g Aerosol A102 (31% solution), 231.9 g Airvol 205 (25% solution), 11.1 g iron sulfate hexahydrate (1% solution), 11.1 9 Versene, 0.6 g ascorbic acid, 6 g sodium acetate, 0.3 g Maroxol 20, 358.6 g acrylamide (50%), 149.4 g hydroxyethyl acrylate and 627.6 g vinyl acetate. The reactor was then purged with nitrogen and with ethylene and heated with agitation to 50° C., then pressurized to 600 psi ethylene. Addition of a t-butyl hydroperoxide solution (197.8 g water and 64 g t-butyl hydroperoxide) and a buffered Bruggolite FF 6® solution (202.9 g water, 57.4 g Bruggolite FF 6® and 1.5 g sodium acetate) was commenced at a 2 hour addition rate. When temperature rise indicated initiation, the jacket temperature was increased to 80° C. When the reactor temperature reached 60° C., a slow addition of an emulsified monomer mix consisting of 1,040 g water, 164.4 g Tergitol 15S5, 659.9 g Airvol 205 (25% solution), 12 g sodium acetate, 1,435.5 g acrylamide (50%), 89.7 g hydroxyethyl acrylate and 717.2 g vinyl acetate was begun at a 2.3 hour rate and the t-butyl hydroperoxide and Bruggolite FF 6® solution rates were reduced by half. Temperature was controlled at 75° C. by reducing the jacket temperature to 70° C. and varying the t-butyl hydroperoxide solution addition rate. During the course of the reaction, the ethylene pressure was allowed to decrease. The t-butyl hydroperoxide and Bruggolite FF 6® solutions were fed for an additional 30 minutes after the end of the monomer slow addition.

The contents were then cooled to 55° C. and transferred to a 20 liter vessel to remove any unreacted ethylene. The following solutions were added to reduce the amount of unreacted monomer: 4.2 g t-butyl hydroperoxide in 17 g water and 4.2 g Bruggolite FF 6® in 17 g water.

The physical properties of the latex were:

| % Solids | 37.1% |
|---|---|
| Viscosity | 560 cps |
| pH | 5.9 |

While a number of embodiments of this invention have been represented, it is apparent that the basic construction can be altered to provide other embodiments which utilize the invention without departing from the spirit and scope of the invention. All such modifications and variations are intended to be included within the scope of the invention as defined in the appended claims rather than the specific embodiments which have been presented by way of example.

I claim:

1. An aqueous emulsion of a copolymer, produced by emulsion polymerization, in which the coplymer comprises in percentages by weight of the copolymer:
   (a) from 2% to about 20% of ethylene monomer units;
   (b) from 20% to about 63% of vinyl acetate monomer units;
   (c) from 35% to about 60% of a functional monomer unit selected from the group consisting of acid-containing monomers, hydroxyl-containing monomers, and mixtures thereof.

2. The aqueous emulsion of a copolymer according to claim 1, wherein the functional monomer unit in (c) is a water-soluble monomer.

3. The aqueous emulsion of a copolymer according to claim 1, wherein the functional monomer unit is an acid-containing monomer selected from the group consisting of $C_3$–$C_{10}$ alkenoic acids, $\alpha$, $\beta$-unsaturated $C_4$–$C_{10}$ alkenedioic acids, and monoesters of $\alpha$, $\beta$-unsaturated $C_4$–$C_{10}$ alkenedioic acids with $C_1$–$C_{18}$ alkanols.

4. The aqueous emulsion of a copolymer according to claim 3, wherein the acid-containing monomer is a $C_3$–$C_{10}$ alkenoic acid selected from the group consisting of acrylic acid, methacrylic acid, crotonic acid, isocrotonic acid, $\beta$-carboxyethyl acrylate and acrylic acid dimer.

5. The aqueous emulsion of a copolymer according to claim 3, wherein the acid-containing monomer is an $\alpha$, $\beta$-unsaturated $C_4$–$C_{10}$ alkenedioic acid selected from the group consisting of maleic acid, maleic anhydride, fumaric acid, and itaconic acid.

6. The aqueous emulsion of a copolymer according to claim 3, wherein the acid-containing monomer is a monoester of $\alpha$, $\beta$-unsaturated $C_4$–$C_{10}$ alkenedioic acid with a $C_1$ to $C_{18}$ alkanol selected from the group consisting of fumarates, maleates, and itaconates.

7. The aqueous emulsion of a copolymer according to claim 1, wherein the functional monomer unit in (c) is an acid-containing monomer selected from the group consisting of styrene sulfonic acid, 2-acrylamido-2-methylpropane sulfonic acid, and sodium vinyl sulfonate.

8. The aqueous emulsion of a copolymer according to claim 7, wherein the acid-containing monomer is 2-acrylamido-2-methylpropane sulfonic acid.

9. The aqueous emulsion of a copolymer according to claim 1, wherein the functional monomer unit in (c) is an acid-containing monomer selected from the group consisting of styrene phosphoric acid, sodium vinyl phosphonate, and $CH_2=C(CH_3)COO(CH_2)_nOPO_3H$, wherein n is from 2 to 4.

* * * * *